(12) United States Patent
Zamora

(10) Patent No.: US 12,093,354 B2
(45) Date of Patent: Sep. 17, 2024

(54) GENERATING A FLOATING INTERACTIVE BOX USING MACHINE LEARNING FOR QUICK-REFERENCE TO RESOURCES

(71) Applicant: Truist Bank, Charlotte, NC (US)

(72) Inventor: Michael A. Zamora, Ocoee, FL (US)

(73) Assignee: TRUIST BANK, Charlotte, NC (US)

( * ) Notice: Subject to any disclaimer, the term of this patent is extended or adjusted under 35 U.S.C. 154(b) by 377 days.

(21) Appl. No.: 17/727,353

(22) Filed: Apr. 22, 2022

(65) Prior Publication Data

US 2023/0342438 A1    Oct. 26, 2023

(51) Int. Cl.
G06F 21/31    (2013.01)

(52) U.S. Cl.
CPC .................................. G06F 21/31 (2013.01)

(58) Field of Classification Search
CPC ........................................................ G06F 21/31
See application file for complete search history.

(56) References Cited

U.S. PATENT DOCUMENTS

| | | | |
|---|---|---|---|
| 9,647,968 B2 * | 5/2017 | Smullen | H04L 67/02 |
| 10,110,584 B1 | 10/2018 | Schmoyer | |
| 10,839,432 B1 | 11/2020 | Konig | |
| 10,915,227 B1 | 2/2021 | Proud | |
| 11,005,997 B1 * | 5/2021 | Deegan | H04L 51/02 |
| 11,076,047 B1 | 7/2021 | Clodore | |
| 11,620,473 B1 * | 4/2023 | Zhang | G06F 18/213 |
| | | | 382/159 |
| 11,709,989 B1 * | 7/2023 | Mohammed | G06N 3/08 |
| | | | 706/20 |
| 11,716,323 B1 | 8/2023 | Moghal | |
| 11,989,776 B1 * | 5/2024 | Hepp | G06Q 30/018 |
| 2005/0132298 A1 | 6/2005 | Lueckhoff | |
| 2015/0161617 A1 | 6/2015 | Kannan | |
| 2015/0334098 A1 | 11/2015 | Keys | |
| 2017/0118223 A1 | 4/2017 | Mathew | |
| 2017/0329466 A1 | 11/2017 | Krenkler | |
| 2018/0032715 A1 | 2/2018 | Jaensch | |
| 2018/0041510 A1 | 2/2018 | Burch | |
| 2018/0219807 A1 * | 8/2018 | Thinguldstad | H04L 51/02 |
| 2018/0367484 A1 | 12/2018 | Rodriguez | |
| 2019/0012390 A1 | 1/2019 | Nishant | |
| 2020/0134020 A1 * | 4/2020 | Rabinovich | G06F 16/337 |
| 2020/0145823 A1 | 5/2020 | Nair | |
| 2021/0201238 A1 | 7/2021 | Sekar | |
| 2021/0201327 A1 | 7/2021 | Konig | |
| 2021/0259786 A1 * | 8/2021 | Pigott | G01T 1/02 |
| 2021/0326940 A1 * | 10/2021 | Serna | G06Q 30/016 |

(Continued)

FOREIGN PATENT DOCUMENTS

AU    2021240196 B1 *    4/2022    ............. G06F 16/43

*Primary Examiner* — Richard G Keehn
(74) *Attorney, Agent, or Firm* — Michael A. Springs, Esq.; Shumaker, Loop & Kendrick, LLP; Patrick B. Horne

(57) ABSTRACT

A system for pre-authenticating a user using a web-based browser or dedicated application, the pre-authentication for fast interactive teleconference session access runs a web-based browser or dedicated application associated with an entity with which the user holds at least one account; performs basic authentication to grant a basic level of remote user access performs elevated authentication and grants (i) an elevated level of remote user access to the at least one account and (ii) access to a pre-authenticated teleconference session.

20 Claims, 10 Drawing Sheets

(56) References Cited

U.S. PATENT DOCUMENTS

| | | |
|---|---|---|
| 2022/0046099 A1 | 2/2022 | Correa Azzolin |
| 2022/0070296 A1 | 3/2022 | Friio |
| 2023/0040119 A1 | 2/2023 | Konig |
| 2023/0095673 A1* | 3/2023 | Dharmasiri ............ G06V 10/82 |
| | | 382/157 |
| 2023/0101224 A1* | 3/2023 | Singh .................... G06N 20/00 |
| | | 707/770 |
| 2023/0222291 A1* | 7/2023 | Ranganathan ......... H04L 51/21 |
| | | 704/9 |
| 2023/0316303 A1* | 10/2023 | Anand .................... G06N 5/01 |
| | | 705/7.31 |
| 2023/0344823 A1 | 10/2023 | Zamora |
| 2023/0344824 A1 | 10/2023 | Zamora |
| 2023/0351117 A1* | 11/2023 | Oh .......................... G06F 40/30 |

\* cited by examiner

GENERATING A FLOATING INTERACTIVE BOX USING MACHINE LEARNING FOR QUICK-REFERENCE TO RESOURCES

FIELD

This invention relates generally to the field of graphical user interfaces, and more particularly embodiments of the invention relate to generating a floating interactive box using machine learning for quick-reference to resources.

BACKGROUND

When users are involved in an interaction with an entity associate, the user may be assisted by access to specific resources and interactive videoconferencing with an associate. However, the most effective resources or quick-references are not easily known. Accordingly, a need exists for systems and methods using machine learning for presenting quick-reference to helpful resources.

BRIEF SUMMARY

Embodiments of the present invention address the above needs and/or achieve other advantages by providing systems and methods for controlling display on a user device of a graphical user interface comprising a floating interactive box using machine learning for quick-reference to resources for a web-based portal or dedicated application on a user device. The system includes at least one processor; a communication interface communicatively coupled to the at least one processor; and a memory device storing executable code that, when executed, causes the processor to transmit to a user device instructions to initiate display of a graphical user interface comprising a floating interactive box comprising an interaction between the user and at least one entity associate, wherein lack of access to necessary resources inhibits efficient resolution of the interaction, thereby unnecessarily consuming computing resources; process data from the interaction using a machine learning algorithm to determine that resolution of the interaction would become more efficient by providing access to at least one resource; enable, over the floating interactive box, access to the at least one resource; receive confirmation from the user device that the interaction is resolved; and upon resolution of the interaction, transmitting instructions to the user device to end display of the floating interaction box, wherein presenting access to the at least one resource resulting in resolution of the interaction and ending display of the floating interactive box quickly frees computing resources for other tasks.

In some embodiments, the executable code is further to cause the processor to receive, through the floating interactive box and from the user device, communication from the user to initiate an interactive teleconference session.

In some embodiments, the executable code is further to cause the processor to process data from the interaction using a machine learning algorithm to determine that an interaction occurring between the user and the associate over the floating interactive box should be transitioned to an interactive teleconference session.

In some embodiments, the data processed using a machine learning algorithm and based on the floating interactive box interaction, to determine that resolution of the interaction would become more efficient by providing access to at least one resource, further comprises a browsing history of the user.

In some embodiments, enabling, over the floating interactive box, access to the at least one resource comprises processing data from the interaction using a machine learning algorithm to determine quick reference or hot words to present to the user to improve the efficiency of the interaction. In some embodiments, enabling, over the floating interactive box, access to the at least one resource further comprises transmitting instructions to initiate display of the quick reference or hot words using the floating interactive box. In some such embodiments, enabling, over the floating interactive box, access to the at least one resource further comprises receiving user selection from the user device of one of the quick reference or hot words; in response to receiving the user selection, navigate the user to the at least one resource.

In some embodiments, the executable code, when executed, further causes the processor to process user requirements data from the interaction using a machine learning algorithm to identify new solutions for the user, the executable code, when executed, further causes the processor to transmit instructions to initiate presentation of the new solutions to the user.

According to embodiments of the invention, a method is performed by a back-end server system and includes transmitting instructions to initiate display of a graphical user interface comprising a floating interactive box comprising an interaction between the user and at least one entity associate, wherein lack of access to necessary resources inhibits efficient resolution of the interaction, thereby unnecessarily consuming computing resources; processing data from the interaction using a machine learning algorithm to determine that resolution of the interaction would become more efficient by providing access to at least one resource; enabling, over the floating interactive box and the user device, access to the at least one resource; receiving confirmation from the user that the interaction is resolved; and upon resolution of the interaction, transmitting instructions to end display of the floating interactive box, wherein presenting access to the at least one resource resulting in resolution of the interaction and ending display of the floating interactive box quickly frees computing resources for other tasks.

In some embodiments, the method includes receiving, through the floating interactive box and from the user device, communication from the user to initiate an interactive teleconference session.

In some embodiments, the method includes processing data from the interaction using a machine learning algorithm to determine that an interaction occurring between the user and the associate over the floating interactive box should be transitioned to an interactive teleconference session. In some such embodiments, the data processed using a machine learning algorithm and based on the floating interactive box interaction, to determine that resolution of the interaction would become more efficient by providing access to at least one resource, further comprises a browsing history of the user.

In some embodiments, enabling, over the floating interactive box, access to the at least one resource comprises processing data from the interaction using a machine learning algorithm to determine quick reference or hot words to present to the user to improve the efficiency of the interaction. In some such embodiments, enabling, over the floating interactive box, access to the at least one resource further comprises transmitting instructions to initiate initiating display of the quick reference or hot words using the floating interactive box.

In some of these embodiments, enabling, over the floating interactive box, access to the at least one resource further comprises receiving user selection from the user device of one of the quick reference or hot words; and in response to receiving the user selection, navigate the user to the at least one resource.

In some embodiments, the method includes processing user requirements data from the interaction using a machine learning algorithm to identify new solutions for the user.

In some embodiments, the method includes transmitting instructions to initiate presentation of the new solutions to the user.

According to embodiments of the invention, a system includes at least one processor; a communication interface communicatively coupled to the at least one processor; and a memory device storing executable code that, when executed, causes the processor to transmit instructions to initiate display on the user device of a graphical user interface comprising a floating interactive box comprising an interaction between the user and at least one entity associate, wherein lack of access to necessary resources inhibits efficient resolution of the interaction, thereby unnecessarily consuming computing resources; process data from the interaction using a machine learning algorithm to determine quick reference or hot words to present to the user to improve the efficiency of the interaction; transmit instructions to initiate display on the user device of the quick reference or hot words using the floating interactive box; receive user selection from the user device of one of the quick reference or hot words; in response to receiving the user selection, navigate the user to the at least one resource; receive confirmation from the user device that the interaction is resolved; and upon resolution of the interaction, transmit instructions to end display of the floating interactive box, wherein presenting access to the at least one resource resulting in resolution of the interaction and ending display of the floating interactive box quickly frees computing resources for other tasks.

In some embodiments, the executable code, when executed, further causes the processor to process user requirements data from the interaction using a machine learning algorithm to identify new solutions for the user; and transmit instructions to initiate presentation of the new solutions to the user.

The features, functions, and advantages that have been discussed may be achieved independently in various embodiments of the present invention or may be combined in yet other embodiments, further details of which can be seen with reference to the following description and drawings.

BRIEF DESCRIPTION OF THE SEVERAL VIEWS OF THE DRAWINGS

Figure 1:
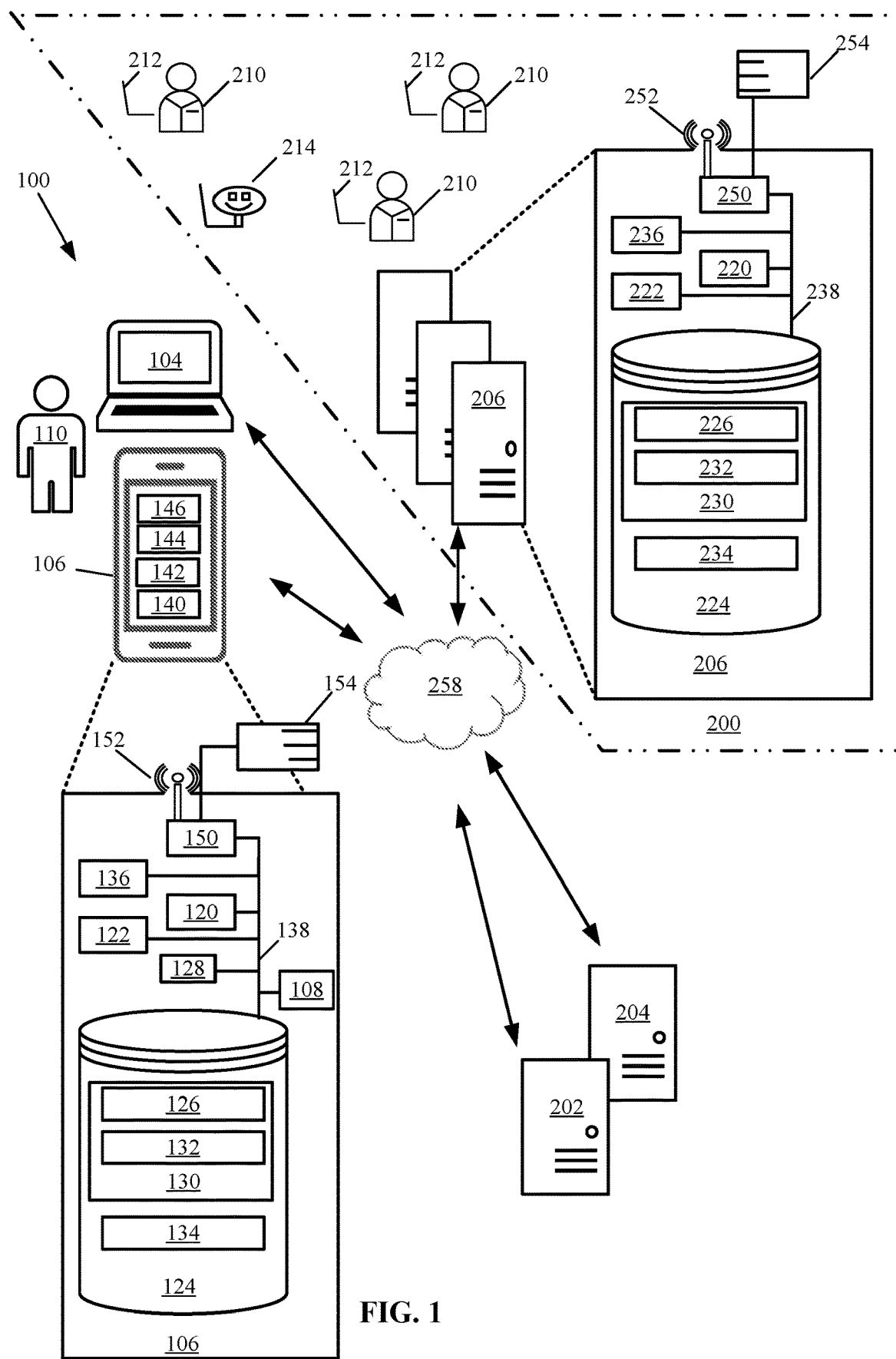

Having thus described embodiments of the invention in general terms, reference will now be made to the accompanying drawings, wherein:

FIG. 1 illustrates an enterprise system, and environment thereof, according to at least one embodiment.

Figure 2A:
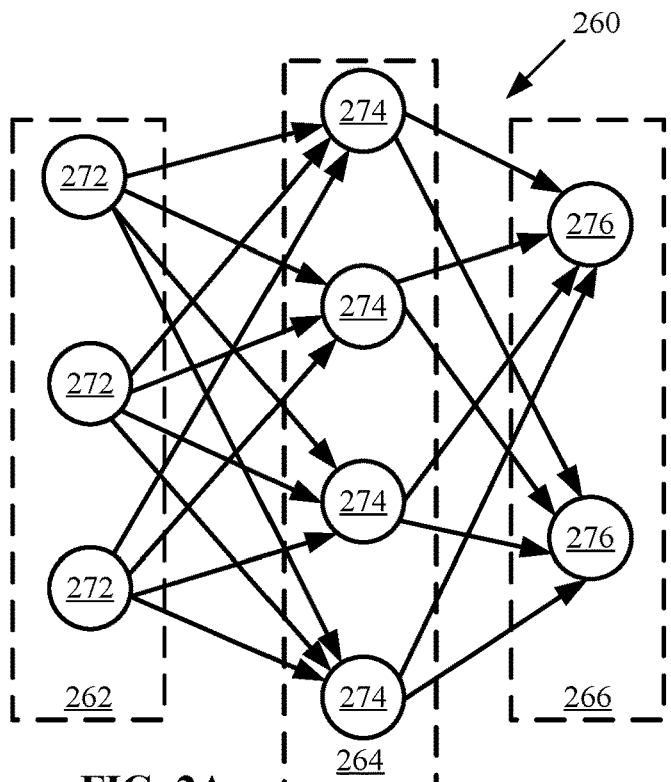
Figure 2C:
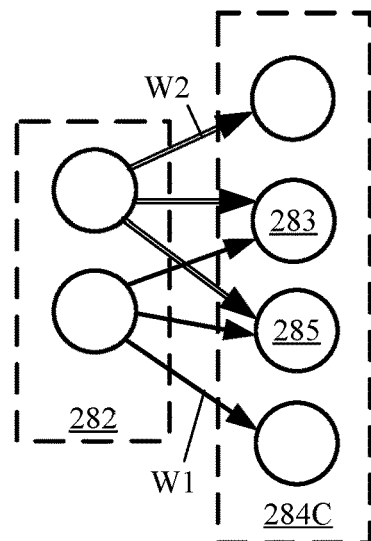
Figure 2B:
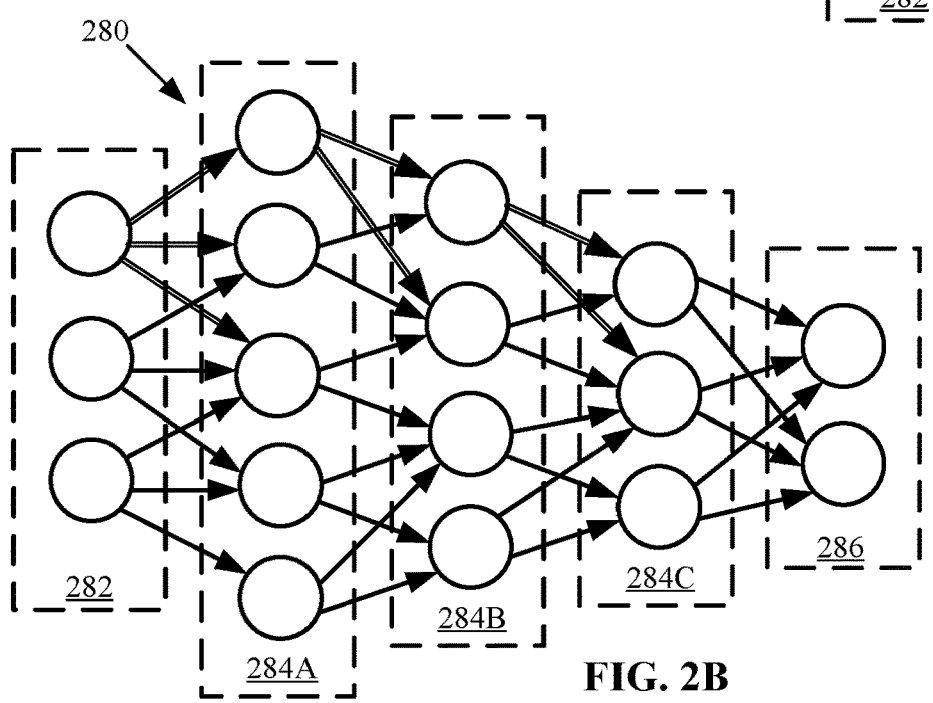

FIG. 2A is a diagram of a feedforward network, according to at least one embodiment, utilized in machine learning FIG. 2B is a diagram of a convolutional neural network (CNN), according to at least one embodiment, utilized in machine learning.

FIG. 2C is a diagram of a portion of the convolutional neural network of FIG. 2B, according to at least one embodiment, illustrating assigned weights at connections or neurons.

Figure 3:
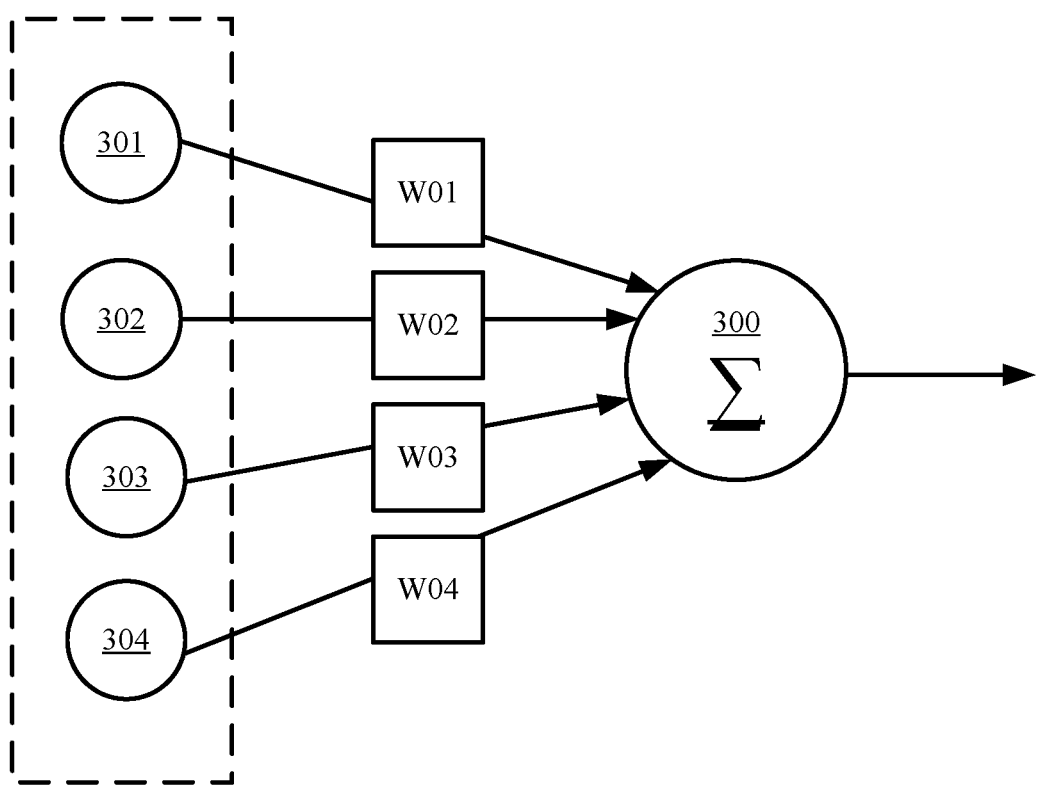

FIG. 3 is a diagram representing an exemplary weighted sum computation in a node in an artificial neural network.

Figure 4:
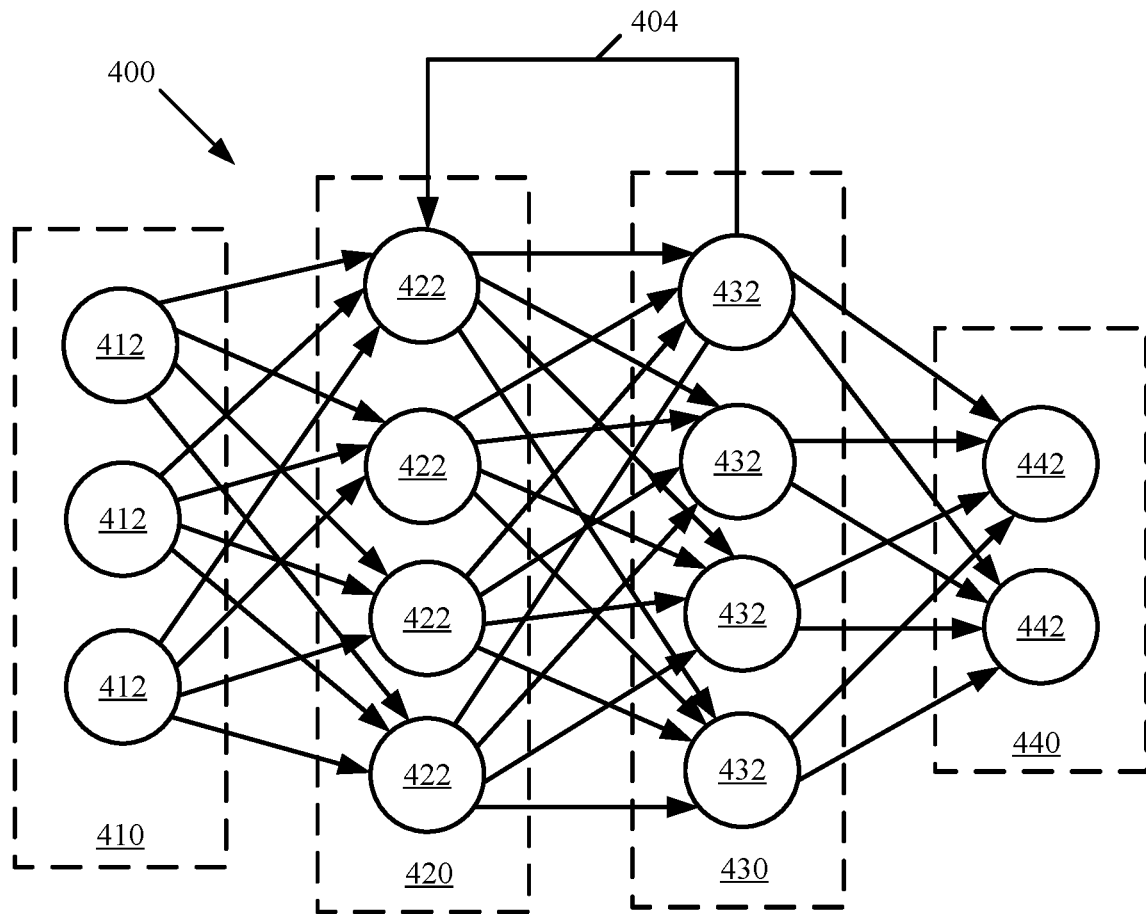

FIG. 4 is a diagram of a Recurrent Neural Network RNN, according to at least one embodiment, utilized in machine learning.

Figure 5:
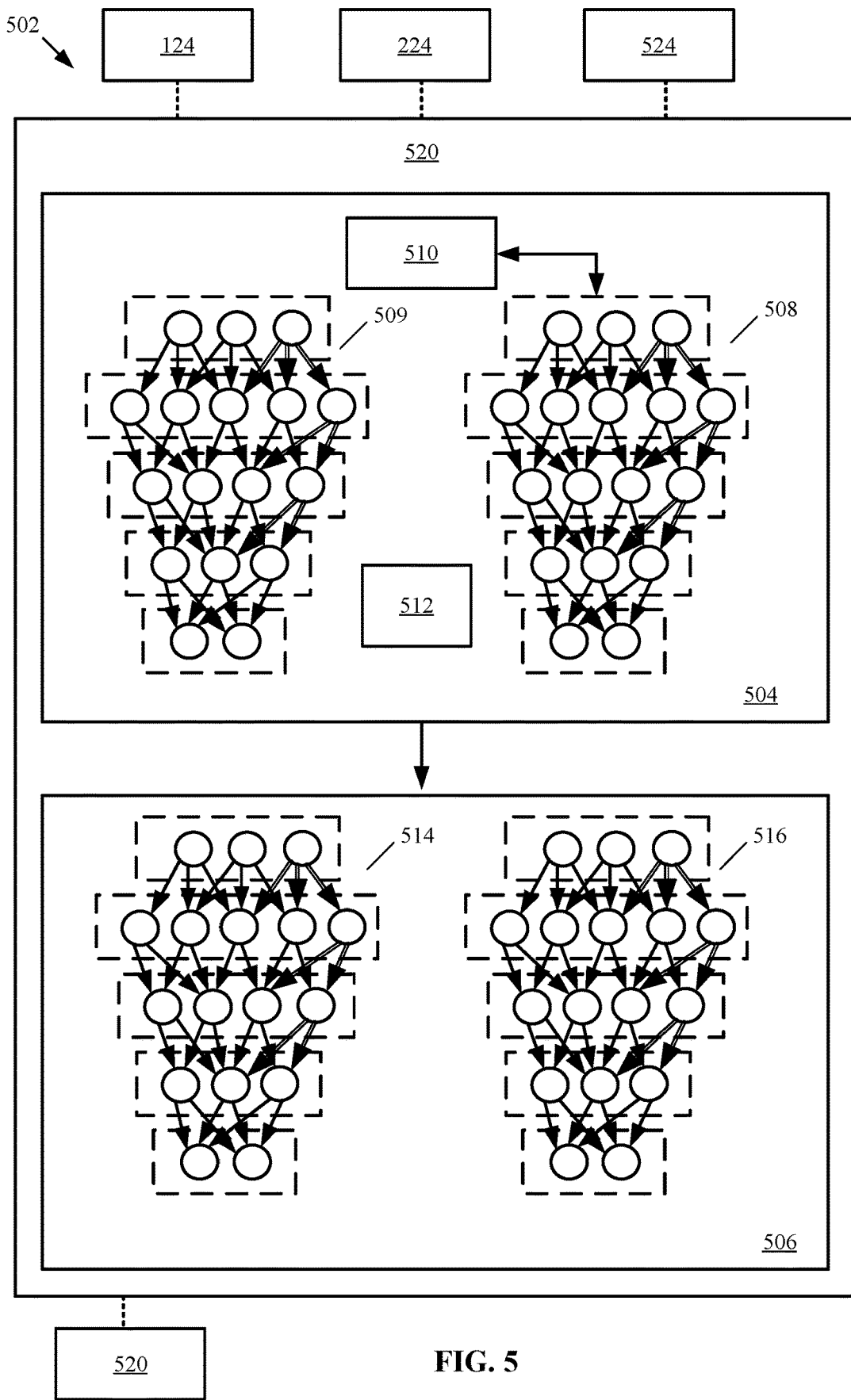

FIG. 5 is a schematic logic diagram of an artificial intelligence program including a front-end and a back-end algorithm.

Figure 6:
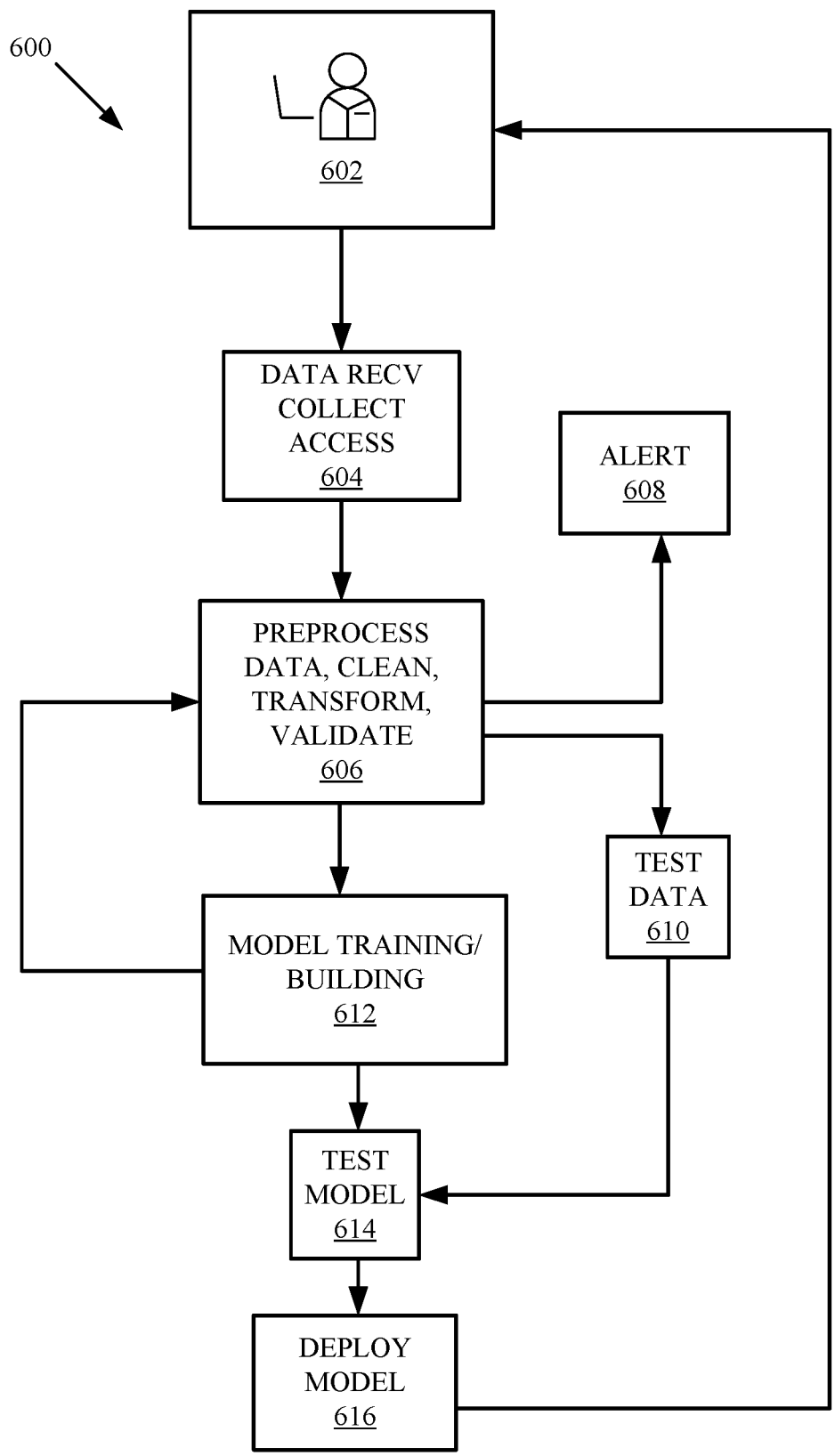

FIG. 6 is a flow chart representing a method, according to at least one embodiment, of model development and deployment by machine learning.

Figure 7:
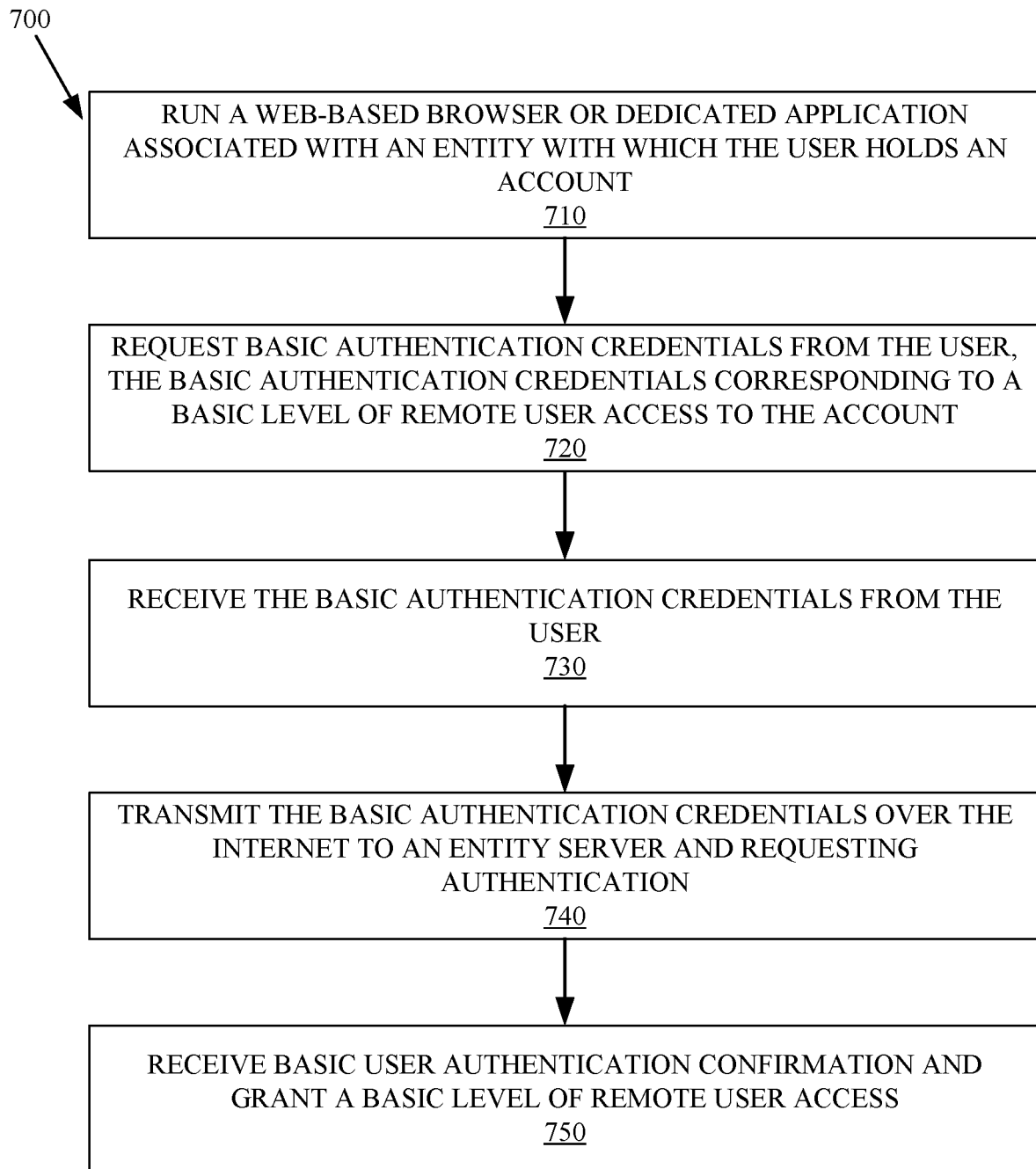

FIG. 7 is a flowchart illustrating a method for performing basic authentication of a user, according to at least one embodiment.

Figure 8:
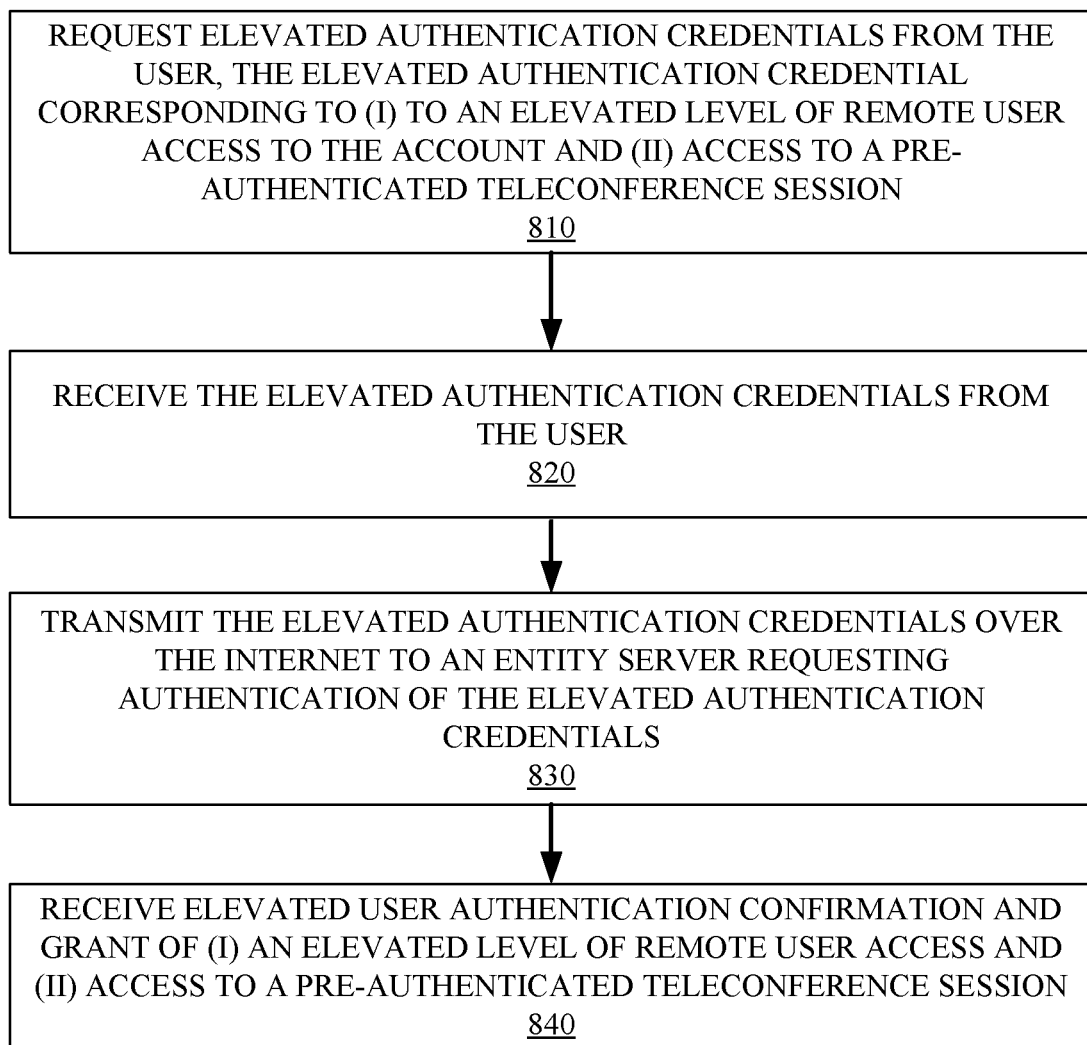

FIG. 8 is a flowchart illustrating a method for performing elevated authentication of a user for access to a pre-authenticated teleconference session, according to at least one embodiment.

Figure 9:
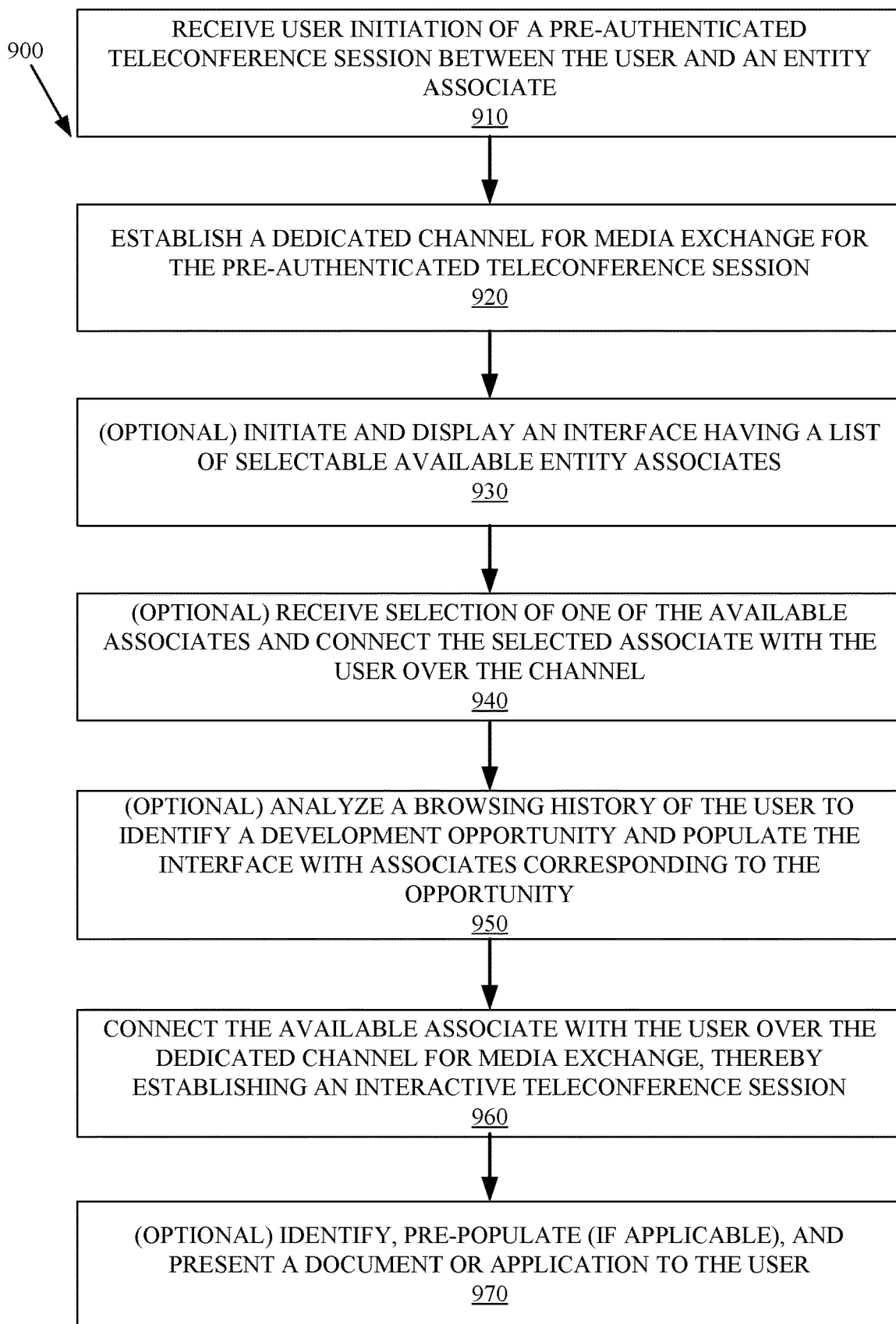

FIG. 9 is a flowchart illustrating a method for providing an interactive teleconference session, according to at least one embodiment.

Figure 10:
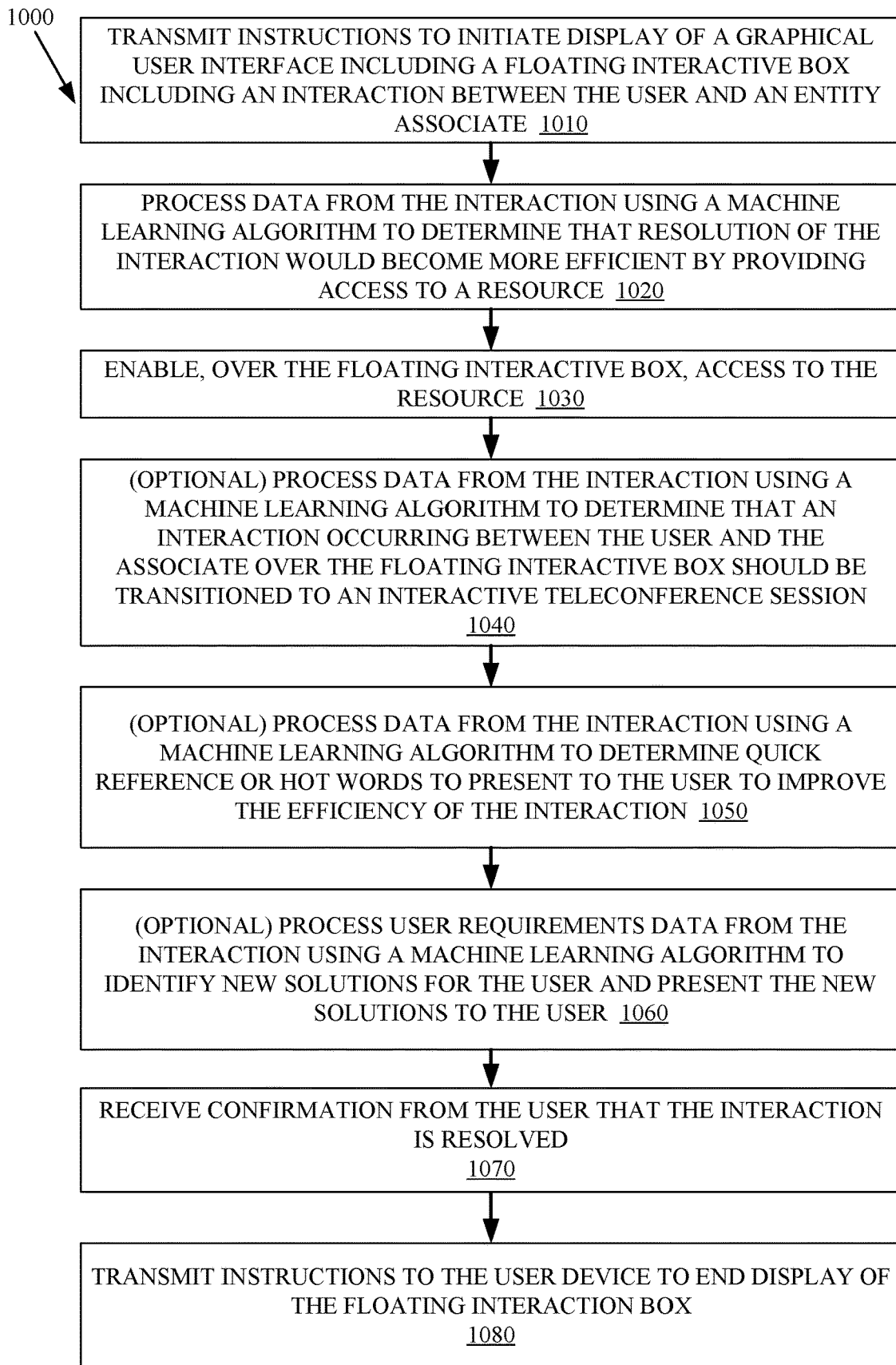

FIG. 10 is a flowchart illustrating a method for processing data using a machine learning algorithm to assist in resolving the interaction.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "coupled," "fixed," "attached to," "communicatively coupled to," "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

Embodiments of the present invention described herein, with reference to flowchart illustrations and/or block diagrams of methods or apparatuses (the term "apparatus" includes systems and computer program products), will be understood such that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

FIG. 1 illustrates a system 100 and environment thereof, according to at least one embodiment, by which a user 110 benefits through use of services and products of an enterprise system 200. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, iOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, user input devices and user output devices, which are operatively coupled to the processing device 120. The user output devices include a display 140 (e.g., a liquid crystal display or the like), which can be, as a non-limiting example, a touch screen of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, and/or other input device(s). The user interface may also include a camera 146, such as a digital camera.

Further non-limiting examples include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The mobile device 106 may also include a positioning device 108, which can be for example a global positioning system device (GPS) configured to be used by a positioning system to determine a location of the mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device. As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, iOS, Android, and any known other operating system used on personal computer, central computing systems, phones, and other devices.

The user devices, referring to either or both of the mobile device 104 and computing device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

Two external systems 202 and 204 are expressly illustrated in FIG. 1, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the enterprise system 200 in back-end transactions clearing processes.

In certain embodiments, one or more of the systems such as the user device 106, the enterprise system 200, and/or the external systems 202 and 204 are, include, or utilize virtual resources. In some cases, such virtual resources are considered cloud resources or virtual machines. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

As used herein, an artificial intelligence system, artificial intelligence algorithm, artificial intelligence module, program, and the like, generally refer to computer implemented programs that are suitable to simulate intelligent behavior (i.e., intelligent human behavior) and/or computer systems and associated programs suitable to perform tasks that typically require a human to perform, such as tasks requiring visual perception, speech recognition, decision-making, translation, and the like. An artificial intelligence system may include, for example, at least one of a series of associated if-then logic statements, a statistical model suitable to map raw sensory data into symbolic categories and the like, or a machine learning program. A machine learning program, machine learning algorithm, or machine learning module, as used herein, is generally a type of artificial intelligence including one or more algorithms that can learn and/or adjust parameters based on input data provided to the algorithm. In some instances, machine learning programs, algorithms, and modules are used at least in part in implementing artificial intelligence (AI) functions, systems, and methods.

Artificial Intelligence and/or machine learning programs may be associated with or conducted by one or more processors, memory devices, and/or storage devices of a computing system or device. It should be appreciated that the AI algorithm or program may be incorporated within the existing system architecture or be configured as a standalone modular component, controller, or the like communicatively coupled to the system. An AI program and/or machine learning program may generally be configured to perform methods and functions as described or implied herein, for example by one or more corresponding flow charts expressly provided or implied as would be understood by one of ordinary skill in the art to which the subjects matters of these descriptions pertain.

A machine learning program may be configured to implement stored processing, such as decision tree learning, association rule learning, artificial neural networks, recurrent artificial neural networks, long short term memory networks, inductive logic programming, support vector machines, clustering, Bayesian networks, reinforcement learning, representation learning, similarity and metric learning, sparse dictionary learning, genetic algorithms, k-nearest neighbor (KNN), and the like. In some embodiments, the machine learning algorithm may include one or more image recognition algorithms suitable to determine one or more categories to which an input, such as data communicated from a visual sensor or a file in JPEG, PNG or other format, representing an image or portion thereof, belongs. Additionally or alternatively, the machine learning algorithm may include one or more regression algorithms configured to output a numerical value given an input. Further, the machine learning may include one or more pattern recognition algorithms, e.g., a module, subroutine or the like capable of translating text or string characters and/or a speech recognition module or subroutine. In various embodiments, the machine learning module may include a machine learning acceleration logic, e.g., a fixed function matrix multiplication logic, in order to implement the stored processes and/or optimize the machine learning logic training and interface.

One type of algorithm suitable for use in machine learning modules as described herein is an artificial neural network or neural network, taking inspiration from biological neural networks. An artificial neural network can, in a sense, learn to perform tasks by processing examples, without being programmed with any task-specific rules. A neural network generally includes connected units, neurons, or nodes (e.g., connected by synapses) and may allow for the machine learning program to improve performance. A neural network may define a network of functions, which have a graphical relationship. As an example, a feedforward network may be utilized, e.g., an acyclic graph with nodes arranged in layers.

A feedforward network (see, e.g., feedforward network 260 referenced in FIG. 2A) may include a topography with a hidden layer 264 between an input layer 262 and an output layer 266. The input layer 262, having nodes commonly referenced in FIG. 2A as input nodes 272 for convenience, communicates input data, variables, matrices, or the like to the hidden layer 264, having nodes 274. The hidden layer 264 generates a representation and/or transformation of the input data into a form that is suitable for generating output data. Adjacent layers of the topography are connected at the edges of the nodes of the respective layers, but nodes within a layer typically are not separated by an edge. In at least one embodiment of such a feedforward network, data is communicated to the nodes 272 of the input layer, which then communicates the data to the hidden layer 264. The hidden layer 264 may be configured to determine the state of the nodes in the respective layers and assign weight coefficients or parameters of the nodes based on the edges separating each of the layers, e.g., an activation function implemented between the input data communicated from the input layer 262 and the output data communicated to the nodes 276 of the output layer 266. It should be appreciated that the form of the output from the neural network may generally depend on the type of model represented by the algorithm. Although the feedforward network 260 of FIG. 2A expressly includes a single hidden layer 264, other embodiments of feedforward networks within the scope of the descriptions can include any number of hidden layers. The hidden layers are intermediate the input and output layers and are generally where all or most of the computation is done.

Neural networks may perform a supervised learning process where known inputs and known outputs are utilized to categorize, classify, or predict a quality of a future input. However, additional or alternative embodiments of the machine learning program may be trained utilizing unsupervised or semi-supervised training, where none of the outputs or some of the outputs are unknown, respectively. Typically, a machine learning algorithm is trained (e.g., utilizing a training data set) prior to modeling the problem with which the algorithm is associated. Supervised training of the neural network may include choosing a network topology suitable for the problem being modeled by the network and providing a set of training data representative of the problem. Generally, the machine learning algorithm may adjust the weight coefficients until any error in the output data generated by the algorithm is less than a predetermined, acceptable level. For instance, the training process may include comparing the generated output produced by the network in response to the training data with a desired or correct output. An associated error amount may then be determined for the generated output data, such as for each output data point generated in the output layer. The associated error amount may be communicated back through the system as an error signal, where the weight coefficients assigned in the hidden layer are adjusted based on the error signal. For instance, the associated error amount (e.g., a value between −1 and 1) may be used to modify the previous coefficient, e.g., a propagated value. The machine learning algorithm may be considered sufficiently trained when the associated error amount for the output data is less than the predetermined, acceptable level (e.g., each data point within the output layer includes an error amount less than the predetermined, acceptable level). Thus, the parameters determined from the training process can be utilized with new input data to categorize, classify, and/or predict other values based on the new input data.

An additional or alternative type of neural network suitable for use in the machine learning program and/or module is a Convolutional Neural Network (CNN). A CNN is a type of feedforward neural network that may be utilized to model data associated with input data having a grid-like topology. In some embodiments, at least one layer of a CNN may include a sparsely connected layer, in which each output of a first hidden layer does not interact with each input of the next hidden layer. For example, the output of the convolution in the first hidden layer may be an input of the next hidden layer, rather than a respective state of each node of the first layer. CNNs are typically trained for pattern recognition, such as speech processing, language processing, and visual processing. As such, CNNs may be particularly useful for implementing optical and pattern recognition programs required from the machine learning program. A CNN includes an input layer, a hidden layer, and an output layer, typical of feedforward networks, but the nodes of a CNN input layer are generally organized into a set of categories via feature detectors and based on the receptive fields of the sensor, retina, input layer, etc. Each filter may then output data from its respective nodes to corresponding nodes of a subsequent layer of the network. A CNN may be configured to apply the convolution mathematical operation to the respective nodes of each filter and communicate the same to the corresponding node of the next subsequent layer. As an example, the input to the convolution layer may be a multidimensional array of data. The convolution layer, or hidden layer, may be a multidimensional array of parameters determined while training the model.

An exemplary convolutional neural network CNN is depicted and referenced as 280 in FIG. 2B. As in the basic feedforward network 260 of FIG. 2A, the illustrated example of FIG. 2B has an input layer 282 and an output layer 286. However where a single hidden layer 264 is represented in FIG. 2A, multiple consecutive hidden layers 284A, 284B, and 284C are represented in FIG. 2B. The edge neurons represented by white-filled arrows highlight that hidden layer nodes can be connected locally, such that not all nodes of succeeding layers are connected by neurons. FIG. 2C, representing a portion of the convolutional neural network 280 of FIG. 2B, specifically portions of the input layer 282 and the first hidden layer 284A, illustrates that connections can be weighted. In the illustrated example, labels W1 and W2 refer to respective assigned weights for the referenced connections. Two hidden nodes 283 and 285 share the same set of weights W1 and W2 when connecting to two local patches.

Weight defines the impact a node in any given layer has on computations by a connected node in the next layer. FIG. 3 represents a particular node 300 in a hidden layer. The node 300 is connected to several nodes in the previous layer representing inputs to the node 300. The input nodes 301, 302, 303 and 304 are each assigned a respective weight W01, W02, W03, and W04 in the computation at the node 300, which in this example is a weighted sum.

An additional or alternative type of feedforward neural network suitable for use in the machine learning program and/or module is a Recurrent Neural Network (RNN). An RNN may allow for analysis of sequences of inputs rather than only considering the current input data set. RNNs typically include feedback loops/connections between layers of the topography, thus allowing parameter data to be communicated between different parts of the neural network. RNNs typically have an architecture including cycles, where past values of a parameter influence the current calculation of the parameter, e.g., at least a portion of the output data from the RNN may be used as feedback/input in calculating subsequent output data. In some embodiments, the machine learning module may include an RNN configured for language processing, e.g., an RNN configured to perform statistical language modeling to predict the next word in a string based on the previous words. The RNN(s) of the machine learning program may include a feedback system suitable to provide the connection(s) between subsequent and previous layers of the network.

An example for a Recurrent Neural Network RNN is referenced as 400 in FIG. 4. As in the basic feedforward network 260 of FIG. 2A, the illustrated example of FIG. 4 has an input layer 410 (with nodes 412) and an output layer 440 (with nodes 442). However, where a single hidden layer 264 is represented in FIG. 2A, multiple consecutive hidden layers 420 and 430 are represented in FIG. 4 (with nodes 422 and nodes 432, respectively). As shown, the RNN 400 includes a feedback connector 404 configured to communicate parameter data from at least one node 432 from the second hidden layer 430 to at least one node 422 of the first hidden layer 420. It should be appreciated that two or more and up to all of the nodes of a subsequent layer may provide or communicate a parameter or other data to a previous layer of the RNN network 400. Moreover and in some embodiments, the RNN 400 may include multiple feedback connectors 404 (e.g., connectors 404 suitable to communicatively couple pairs of nodes and/or connector systems 404 configured to provide communication between three or more nodes). Additionally or alternatively, the feedback connector 404 may communicatively couple two or more nodes having at least one hidden layer between them, i.e., nodes of nonsequential layers of the RNN 400.

In an additional or alternative embodiment, the machine learning program may include one or more support vector machines. A support vector machine may be configured to determine a category to which input data belongs. For example, the machine learning program may be configured to define a margin using a combination of two or more of the input variables and/or data points as support vectors to maximize the determined margin. Such a margin may generally correspond to a distance between the closest vectors that are classified differently. The machine learning program may be configured to utilize a plurality of support vector machines to perform a single classification. For example, the machine learning program may determine the category to which input data belongs using a first support vector determined from first and second data points/variables, and the machine learning program may independently categorize the input data using a second support vector determined from third and fourth data points/variables. The support vector machine(s) may be trained similarly to the training of neural networks, e.g., by providing a known input vector (including values for the input variables) and a known output classification. The support vector machine is trained by selecting the support vectors and/or a portion of the input vectors that maximize the determined margin.

As depicted, and in some embodiments, the machine learning program may include a neural network topography having more than one hidden layer. In such embodiments, one or more of the hidden layers may have a different number of nodes and/or the connections defined between layers. In some embodiments, each hidden layer may be configured to perform a different function. As an example, a first layer of the neural network may be configured to reduce a dimensionality of the input data, and a second layer of the neural network may be configured to perform statistical programs on the data communicated from the first layer. In various embodiments, each node of the previous layer of the network may be connected to an associated node of the subsequent layer (dense layers). Generally, the neural network(s) of the machine learning program may include a relatively large number of layers, e.g., three or more layers, and are referred to as deep neural networks. For example, the node of each hidden layer of a neural network may be associated with an activation function utilized by the machine learning program to generate an output received by a corresponding node in the subsequent layer. The last hidden layer of the neural network communicates a data set (e.g., the result of data processed within the respective layer) to the output layer. Deep neural networks may require more computational time and power to train, but the additional hidden layers provide multistep pattern recognition capability and/or reduced output error relative to simple or shallow machine learning architectures (e.g., including only one or two hidden layers).

Referring now to FIG. 5 and some embodiments, an AI program 502 may include a front-end algorithm 504 and a back-end algorithm 506. The artificial intelligence program 502 may be implemented on an AI processor 520, such as the processing device 120, the processing device 220, and/or a dedicated processing device. The instructions associated with the front-end algorithm 504 and the back-end algorithm 506 may be stored in an associated memory device and/or storage device of the system (e.g., memory device 124 and/or memory device 224) communicatively coupled to the AI processor 520, as shown. Additionally or alternatively, the system may include one or more memory devices and/or storage devices (represented by memory 524 in FIG. 5) for processing use and/or including one or more instructions necessary for operation of the AI program 502. In some embodiments, the AI program 502 may include a deep neural network (e.g., a front-end network 504 configured to perform pre-processing, such as feature recognition, and a back-end network 506 configured to perform an operation on the data set communicated directly or indirectly to the back-end network 506). For instance, the front-end program 506 can include at least one CNN 508 communicatively coupled to send output data to the back-end network 506.

Additionally or alternatively, the front-end program 504 can include one or more AI algorithms 510, 512 (e.g., statistical models or machine learning programs such as decision tree learning, associate rule learning, recurrent artificial neural networks, support vector machines, and the like). In various embodiments, the front-end program 504 may be configured to include built in training and inference logic or suitable software to train the neural network prior to use (e.g., machine learning logic including, but not limited to, image recognition, mapping and localization, autonomous navigation, speech synthesis, document imaging, or language translation). For example, a CNN 508 and/or AI algorithm 510 may be used for image recognition, input categorization, and/or support vector training. In some embodiments and within the front-end program 504, an output from an AI algorithm 510 may be communicated to a CNN 508 or 509, which processes the data before communicating an output from the CNN 508, 509 and/or the front-end program 504 to the back-end program 506. In various embodiments, the back-end network 506 may be configured to implement input and/or model classification, speech recognition, translation, and the like. For instance, the back-end network 506 may include one or more CNNs (e.g., CNN 514) or dense networks (e.g., dense networks 516), as described herein.

For instance and in some embodiments of the AI program 502, the program may be configured to perform unsupervised learning, in which the machine learning program performs the training process using unlabeled data, e.g., without known output data with which to compare. During such unsupervised learning, the neural network may be configured to generate groupings of the input data and/or determine how individual input data points are related to the complete input data set (e.g., via the front-end program 504). For example, unsupervised training may be used to configure a neural network to generate a self-organizing map, reduce the dimensionally of the input data set, and/or to perform outlier/anomaly determinations to identify data points in the data set that falls outside the normal pattern of the data. In some embodiments, the AI program 502 may be trained using a semi-supervised learning process in which some but not all of the output data is known, e.g., a mix of labeled and unlabeled data having the same distribution.

In some embodiments, the AI program 502 may be accelerated via a machine learning framework 520 (e.g., hardware). The machine learning framework may include an index of basic operations, subroutines, and the like (primitives) typically implemented by AI and/or machine learning algorithms. Thus, the AI program 502 may be configured to utilize the primitives of the framework 520 to perform some or all of the calculations required by the AI program 502. Primitives suitable for inclusion in the machine learning framework 520 include operations associated with training a convolutional neural network (e.g., pools), tensor convolutions, activation functions, basic algebraic subroutines and programs (e.g., matrix operations, vector operations), numerical method subroutines and programs, and the like.

It should be appreciated that the machine learning program may include variations, adaptations, and alternatives suitable to perform the operations necessary for the system, and the present disclosure is equally applicable to such suitably configured machine learning and/or artificial intelligence programs, modules, etc. For instance, the machine learning program may include one or more long short-term memory (LSTM) RNNs, convolutional deep belief networks, deep belief networks DBNs, and the like. DBNs, for instance, may be utilized to pre-train the weighted characteristics and/or parameters using an unsupervised learning process. Further, the machine learning module may include one or more other machine learning tools (e.g., Logistic Regression (LR), Naive-Bayes, Random Forest (RF), matrix factorization, and support vector machines) in addition to, or as an alternative to, one or more neural networks, as described herein.

FIG. 6 is a flow chart representing a method 600, according to at least one embodiment, of model development and deployment by machine learning. The method 600 represents at least one example of a machine learning workflow in which steps are implemented in a machine learning project.

In step 602, a user authorizes, requests, manages, or initiates the machine-learning workflow. This may represent a user such as human agent, or customer, requesting machine-learning assistance or AI functionality to simulate intelligent behavior (such as a virtual agent) or other machine-assisted or computerized tasks that may, for example, entail visual perception, speech recognition, decision-making, translation, forecasting, predictive modelling, and/or suggestions as non-limiting examples. In a first iteration from the user perspective, step 602 can represent a starting point. However, with regard to continuing or improving an ongoing machine learning workflow, step 602 can represent an opportunity for further user input or oversight via a feedback loop.

In step 604, data is received, collected, accessed, or otherwise acquired and entered as can be termed data ingestion. In step 606 the data ingested in step 604 is pre-processed, for example, by cleaning, and/or transformation such as into a format that the following components can digest. The incoming data may be versioned to connect a data snapshot with the particularly resulting trained model. As newly trained models are tied to a set of versioned data, preprocessing steps are tied to the developed model. If new data is subsequently collected and entered, a new model will be generated. If the preprocessing step 606 is updated with newly ingested data, an updated model will be generated. Step 606 can include data validation, which focuses on confirming that the statistics of the ingested data are as expected, such as that data values are within expected numerical ranges, that data sets are within any expected or required categories, and that data comply with any needed distributions such as within those categories. Step 606 can proceed to step 608 to automatically alert the initiating user, other human or virtual agents, and/or other systems, if any anomalies are detected in the data, thereby pausing or terminating the process flow until corrective action is taken.

In step 610, training test data such as a target variable value is inserted into an iterative training and testing loop. In step 612, model training, a core step of the machine learning work flow, is implemented. A model architecture is trained in the iterative training and testing loop. For example, features in the training test data are used to train the model based on weights and iterative calculations in which the target variable may be incorrectly predicted in an early iteration as determined by comparison in step 614, where the model is tested. Subsequent iterations of the model training, in step 612, may be conducted with updated weights in the calculations.

When compliance and/or success in the model testing in step 614 is achieved, process flow proceeds to step 616, where model deployment is triggered. The model may be utilized in AI functions and programming, for example to simulate intelligent behavior, to perform machine-assisted or computerized tasks, of which visual perception, speech recognition, decision-making, translation, forecasting, predictive modelling, and/or automated suggestion generation serve as non-limiting examples.

According to embodiments of the invention, a system for pre-authenticating a user using a web-based browser or dedicated application, the pre-authentication for fast interactive teleconference session access runs a web-based browser or dedicated application associated with an entity with which the user holds at least one account; request basic authentication credentials from the user, the basic authentication credentials corresponding to a basic level of remote user access to the at least one account; receive the basic authentication credentials from the user; transmit the basic authentication credentials over the Internet to an entity server and requesting authentication of the basic authentication credentials; receive basic user authentication confirmation and grant of basic level of remote user access over the Internet from the entity server; request elevated authentication credentials from the user, the elevated authentication credential corresponding (i) to an elevated level of remote user access to the at least one account and (ii) access to a pre-authenticated teleconference session; receive the elevated authentication credentials from the user; transmit the elevated authentication credentials over the Internet to an entity server and requesting authentication of the elevated authentication credentials; and receive elevated user authentication confirmation and grant of (i) an elevated level of remote user access and (ii) access to a pre-authenticated teleconference session, over the Internet from the entity server.

A system for pre-authenticating a user using a web-based browser or dedicated application, the pre-authentication for fast interactive teleconference session access runs a web-based browser or dedicated application associated with an entity with which the user holds at least one account; requests basic authentication credentials from the user, the basic authentication credentials corresponding to a basic level of remote user access to the at least one account; receives the basic authentication credentials from the user; transmits the basic authentication credentials over the Internet to an entity server and requesting authentication of the basic authentication credentials; receives basic user authentication confirmation and grant of basic level of remote user access over the Internet from the entity server; requests elevated authentication credentials from the user, the elevated authentication credential corresponding (i) to an elevated level of remote user access to the at least one account and (ii) access to a pre-authenticated teleconference session; receives the elevated authentication credentials from the user; transmits the elevated authentication credentials over the Internet to an entity server and requesting authentication of the elevated authentication credentials; and receives elevated user authentication confirmation and grant of (i) an elevated level of remote user access and (ii) access to a pre-authenticated teleconference session, over the Internet from the entity server.

A back-end server system for pre-authenticating a user using a web-based browser or dedicated application, the pre-authentication for fast interactive teleconference session access, includes at least one processor; a communication interface communicatively coupled to the at least one processor; and a memory device storing executable code that, when executed, causes the processor to: respond to a request for web-based browser or dedicated application interaction associated with an entity with which the user holds at least one account; receive basic authentication credentials and a request for authentication of the basic authentication credentials from a user device over the Internet, the basic authentication credentials corresponding to a basic level of remote user access to the at least one account; perform authentication of the basic user authentication credentials; in response to successful authentication of the basic user authentication credentials, generate and transmit a basic user authentication confirmation over the Internet to the user device; grant a basic level of remote user access over the Internet to the user device; initiate the user device requesting elevated authentication credentials from the user, the elevated authentication credential corresponding (i) to an elevated level of remote user access to the at least one account and (ii) access to a pre-authenticated teleconference session; receive the elevated authentication credentials from the user device over the Internet; perform authentication of the elevated user authentication credentials; in response to successful authentication of the elevated user authentication credentials, generate and transmit an elevated user authentication confirmation over the Internet to the user device; and grant (i) an elevated level of remote user access and (ii) access to a pre-authenticated teleconference session, over the Internet from the entity server.

According to some embodiments, a user device for displaying a graphical user interface comprising a floating interactive box using machine learning for quick-reference to resources for a web-based portal or dedicated application on the user device, includes at least one processor; a communication interface communicatively coupled to the at least one processor; and a memory device storing executable code that, when executed, causes the processor to: in response to receiving instructions from a back-end server system, initiate display of a graphical user interface comprising a floating interactive box comprising an interaction between the user and at least one entity associate, wherein lack of access to necessary resources inhibits efficient resolution of the interaction, thereby unnecessarily consuming computing resources; wherein the back-end server system processes data from the interaction using a machine learning algorithm to determine that resolution of the interaction would become more efficient by providing access to at least one resource; in response to receiving instructions from the back-end server system, enable, over the floating interactive box, access to the at least one resource; receive confirmation from the user that the interaction is resolved and transmit the confirmation to the back-end server system; and upon resolution of the interaction and in response to receiving instructions from the back-end server system, end display of the floating interactive box, wherein presenting access to the at least one resource resulting in resolution of the interaction and ending display of the floating interactive box quickly frees computing resources for other tasks.

Referring now to FIG. 7, a flowchart illustrates a method 700 for performing a basic authentication of a user according to embodiments of the invention. The method 700 is performed by a user device which may be a mobile device or a non-mobile device, communicating with a back-end server system of the entity. The first step, as represented by block 710 is to run a web-based browser or dedicated application associated with an entity with which the user holds at least one account or other product or relationship. The web-based browser is navigated to the online banking platform for the entity when it is a bank. The dedicated application may be a mobile application downloaded from an app store or other application hub for mobile devices.

The next step, as represented by block 720, is to request basic authentication credentials from the user. The basic authentication credentials correspond to a basic level of remote user access to the user's account(s) and may include a username and password or other basic credentials. The request may be initiated by the back-end server system or may be initiated from the web-based browser based on directions from the online banking platform (which may come from a back-end server system or another entity system), or may originate from the dedicated mobile app. The request to the user may be presented as a pop-up window or in line in the application or web-site content. The request may be in response to the user attempting to navigate to information, such as account information, that is confidential and is only disclosed upon basic user authentication.

The next step, as represented by block 730, is to receive the basic authentication credentials from the user. The user device may receive input from the user. The next step, as represented by block 740, is to transmit the basic authentication credentials over the Internet to an entity server and request authentication from the server. The user device may transmit the authentication credentials to the back-end server system and request authentication of the user.

The next step, as represented by block 750, is to receive basic user authentication confirmation and to grant a basic level of remote user access. The back-end server system may determine whether the submitted authentication credentials authenticate the user for access. If so, the back-end server system grants access by transmitting authentication confirmation to the user device, which is received at the user device, which grants a basic level of access to the user.

Referring now to FIG. 8, a flowchart illustrates a method 800 for performing an elevated level of authentication according to embodiments of the invention. The first step, as represented by block 810, is to request elevated authentication credentials from the user. The elevated authentication credentials correspond to both an elevated level of remote user access to the user's account(s) and also access to a pre-authenticated teleconference session. The request for elevated authentication may come in response to the user attempting to navigate to confidential information within the mobile app or within a website. It may come in response to a user request for teleconference; however, in some embodiments, the request for elevated authentication comes when the user initiates a floating chat box interaction with an entity associate. Such early request for elevated authentication may provide efficiency for the interaction as it progresses, such as when additional documentation, applications, or interactive session access is needed.

The next step, as represented by block 820, is to receive the elevated authentication credentials from the user. This is done through the user device. The next step, as represented by block 830, is to transmit the elevated authentication credentials over the Internet to an entity server requesting authentication of the elevated authentication credentials. The user device transmits the credentials to the back-end server system with the request to authenticate. The next step, as represented by block 840, is to receive elevated user authentication confirmation and grant both an elevated level of remote user access to the user's account(s) and also access to a pre-authenticated teleconference session.

Referring now to FIG. 9, a flowchart illustrates a method 900 for providing an interactive teleconference session, according to embodiments of the invention. The first step, as represented by block 910, is to receive user initiation of a pre-authenticated teleconference session between the user and an entity associate. Initiation of the session may originate from the user or from the entity or associate. As such, initiation may be performed by the user device or the back-end server system of the entity. In some embodiments, the floating chat box may be facilitating a chat interaction between the user and the entity associate, and the user provides a selection or input that an interactive session would be helpful, which initiates the session.

The next step, as represented by block 920, is to establish a dedicated channel for media exchange for the pre-authenticated teleconference session. This step may involve a communication handshake between the user device and the back-end server system (or another entity server). The dedicated channel for communication may be wrapped in protective measures such as encryption or other security measures to prevent hacking. In some embodiments, the dedicated channel is created only over secure communication pathways between the user device and the entity, for example, over a hard-wired connection that is known to be secure, such as at an automated teller machine (ATM).

The next step, as represented by block 930, in some embodiments, is to initiate and display an interface having a list of selectable available entity associates. The interface may be initiated by the mobile app, the website, the user device or the back-end server system. The list of selectable entity associates may be formed based on associates corresponding to lines of business within the entity that match the topic(s) being discussed in the floating chat box. In some embodiments, the back-end server system uses a machine learning algorithm to analyze data from the interaction to identify the most relevant list of associates to present to the user for selection.

The next step, as represented by block 940, in some embodiments, is to receive selection of one of the available associates. Receiving selection occurs at the user device when the user makes a selection.

The next step, as represented by block 950, in some embodiments, is to analyze a browsing history of the user to identify a development opportunity and to populate the interface with associates corresponding to the opportunity. Such analysis may include identifying the products or services which the user has viewed within a period of time looking back from present and thereby populate the list of associates. The list may be narrowed by determining which associates are online and available to conduct an interactive session.

The next step, as represented by block 960, is to connect the available associate with the user over the dedicated channel for media exchange, thereby establishing an interactive teleconference session. The user's selection of an available associate (step 940) may be transmitted to the back-end server system. In other cases, the browsing history may be analyzed to select associate(s) (step 950) for the session or may identify a list of associates which may be narrowed based on those available and one or more selected by the user. In any event, the back-end server system may then place the user and the selected associate(s) into the dedicated communication channel for beginning the interaction session, which may involve an audio-video interaction between the user and the associate(s).

The next step, as represented by block 970, in some embodiments, is to identify a resource or document or to pre-populate an application document or other document with personal information corresponding to the user and then present the pre-populated application document or other document to the user for completion or acceptance of the application for a product.

FIG. 10 is a flowchart illustrating a method for processing data using a machine learning algorithm to assist in resolving the interaction according to embodiments of the invention. The machine learning algorithm may be or include one or more of the algorithms or methods discussed in detail above. For example, the machine learning algorithm may involve natural language processing of the words being spoken in an audio or audio-video conference or the words being typed in a floating chat box in order to identify ways to make the interaction more efficient.

The first step, as represented by block 1010, is to transmit instructions to initiate display of a graphical user interface including a floating interactive box including an interaction between the user and an entity associate. This GUI may be or include a floating chat box as discussed herein and may include an interactive session as discussed herein.

The next step, as represented by block 1020, is to process data from the interaction using a machine learning algorithm to determine that resolution of the interaction would become more efficient by providing access to a resource such as a document, a webpage with information about a topic being discussed, a person such as an associate or some other resource.

The next step, as represented by block 1030, is to enable, over the floating interactive box, access to the resource. Such access may include providing a hyperlink, hot link, or other reference or pointer that directs the user to the resource. The access may only be granted, in certain embodiments, after the user has overcome a basic level of authentication, and in other embodiments, only when the user has overcome an elevated level of authentication.

The next step, as represented by block 1040, in some embodiments, is to process data from the interaction using a machine learning algorithm to determine that an interaction occurring between the user and the associate over the floating interactive box should be transitioned to an interactive teleconference session. Such determination involves making the comparison of the efficiency of the present interaction versus the expected efficiency of an interactive teleconference session. In the event the expected efficiency of the interactive teleconference session is better than the present interaction, or in some embodiments, in the event that the efficiency is a predetermined amount more than the present interaction, the decision is made by the system to transition the interaction to a session. In some embodiments, the system notifies the user and receives acceptance of the proposal to transition the interaction to an interactive session, and in other embodiments, the system merely automatically transitions the interaction. In some embodiments, the system announces the transition is occurring to both participants and announces one or more topics of discussion that the system has determined, through the machine learning process, are expected to make the interaction more efficient.

The next step, as represented by block 1050, in some embodiments, is to process data from the interaction using a machine learning algorithm to determine quick reference or hot words to present to the user to improve the efficiency of the interaction. Similar to the above, the system may utilize a machine learning algorithm in order to identify and present to the user specific resources such as quick references or hot words in order to assist in resolving the topics being discussed via the interaction.

The next step, as represented by block 1060, in some embodiments, is to process user requirements data from the interaction using a machine learning algorithm to identify new solutions for the user and present the new solutions to the user. User requirements, or user needs are identified by a machine learning algorithm based on the user data input into the system. This may include user browsing history, user products, user interaction transcripts from interactions with entity associates and the like. In other embodiments, the user is simply asked what their needs or requirements are, and they are received from the user directly. Such requirements then serve as the input to a machine learning algorithm process that results in identification of new solutions for the user, which are presented to the user for consideration.

The next step, as represented by block 1070, is to receive confirmation from the user that the interaction is resolved. The final step, as represented by block 1080, is to transmit instructions to the user device to end display of the floating interaction box. Once the interaction is drawing to a close and/or the interactive session is drawing to a close, the system asks the user to confirm that the interaction topic is resolved so that the system can end the interaction including ending display of the floating chat box and the interaction session. Ceasing the interaction quickly can recapture valuable resources to be used for other interactions or session. Particular embodiments and features have been described with reference to the drawings. It is to be understood that these descriptions are not limited to any single embodiment or any particular set of features. Similar embodiments and features may arise or modifications and additions may be made without departing from the scope of these descriptions and the spirit of the appended claims.

What is claimed is:

1. A back-end server system for controlling display on a user device of a graphical user interface comprising a floating interactive box using machine learning for quick-reference to resources for a web-based portal or dedicated application on a user device, the system comprising:
   at least one processor;
   a communication interface communicatively coupled to the at least one processor; and
   a memory device storing executable code that, when executed, causes the processor to:
      transmit to a user device instructions to initiate display of a graphical user interface comprising a floating interactive box comprising an interaction between the user and at least one entity associate, wherein lack of access to necessary resources inhibits efficient resolution of the interaction, thereby unnecessarily consuming computing resources;
      process data from the interaction using a machine learning algorithm to determine that resolution of the interaction would become more efficient by providing access to at least one resource;
      transmit further instructions initiate display of a pointer for directing to the at least one resource and receive an input, via the pointer, to initiate an authentication procedure to access the at least one resource;
      receive and authenticate user credentials of the user via a basic level of authentication or an elevated level of authentication, the elevated level of authentication differing from the basic level of authentication and corresponding to an elevated level of account access needed to obtain access to the at least one resource, the user credentials facilitating access to the at least one resource;
      transmit additional instructions to initiate display, over the floating interactive box and based on the user credentials being authenticated, the at least one resource;
      receive confirmation from the user device that the interaction is resolved; and
      upon resolution of the interaction, transmit another set of instructions to the user device to end display of the floating interaction box, wherein presenting access to the at least one resource resulting in resolution of the interaction and ending display of the floating interactive box quickly frees computing resources for other tasks.

2. The back-end server system of claim 1, wherein the executable code is further to cause the processor to:
   receive, through the floating interactive box and from the user device, communication from the user to initiate an interactive teleconference session.

3. The back-end server system of claim 1, wherein the executable code is further to cause the processor to:
   process data from the interaction using a machine learning algorithm to determine that the interaction occurring between the user and the associate over the floating interactive box should be transitioned to an interactive audio-video teleconference session.

4. The back-end server system of claim 1, wherein the data processed using a machine learning algorithm and based on the floating interactive box interaction, to determine that resolution of the interaction would become more efficient by providing access to at least one resource, further comprises a browsing history of the user.

5. The back-end server system of claim 1, wherein the transmitting the additional instructions to initiate display, over the floating interactive box, the at least one resource is based on:
the machine learning algorithm determining that presenting quick reference or hot words to the user would improve the efficiency of the interaction.

6. The back-end server system of claim 5, wherein access to the at least one resource is facilitated using the quick reference or hot words and the transmitting of the additional instructions to initiate display of the at least one resource includes transmitting of the additional instructions to initiate display of the quick reference or hot words using the floating interactive box.

7. The back-end server system of claim 6, wherein in response to the quick reference or hot words being displayed, over the floating interactive box, the executable code, when executed, further causes the processor to:
receive user selection from the user device of one of the quick reference or hot words;
in response to receiving the user selection, navigate the user to the at least one resource.

8. The back-end server system of claim 1, wherein the executable code, when executed, further causes the processor to:
process user requirements data from the interaction using a machine learning algorithm to identify new solutions for the user.

9. The back-end server system of claim 1, wherein the executable code, when executed, further causes the processor to:
transmit instructions to initiate presentation of the new solutions to the user.

10. A method for controlling display on a user device of a graphical user interface comprising a floating interactive box using machine learning for quick-reference to objects for a user using a web-based portal or dedicated application on a user device, the method performed by a back-end server system and comprising:
transmitting instructions to initiate display of a graphical user interface comprising a floating interactive box comprising an interaction between the user and at least one entity associate, wherein lack of access to necessary resources inhibits efficient resolution of the interaction, thereby unnecessarily consuming computing resources;
processing data from the interaction using a machine learning algorithm to determine that resolution of the interaction would become more efficient by providing access to at least one resource;
transmitting further instructions to initiate display a pointer for directing to the at least one resource and receiving an input, via the pointer, to initiate an authentication procedure to access the at least one resource;
receiving and authenticating user credentials of the user via a basic level of authentication or an elevated level of authentication, the elevated level of authentication differing from the basic level of authentication and corresponding to an elevated level of account access needed to obtain access to the at least one resource, the user credentials facilitating access to the at least one resource;
transmitting additional instructions to initiate display, over the floating interactive box and based on the user credentials being authenticated, the at least one resource;
receiving confirmation from the user device that the interaction is resolved; and
upon resolution of the interaction, transmitting another set of instructions to end display of the floating interactive box, wherein presenting access to the at least one resource resulting in resolution of the interaction and ending display of the floating interactive box quickly frees computing resources for other tasks.

11. The method of claim 10, further comprising:
receiving, through the floating interactive box and from the user device, communication from the user to initiate an interactive teleconference session.

12. The method of claim 10, further comprising:
processing data from the interaction using a machine learning algorithm to determine that an interaction occurring between the user and the associate over the floating interactive box should be transitioned to an interactive teleconference session.

13. The method of claim 10, wherein the data processed using a machine learning algorithm and based on the floating interactive box interaction, to determine that resolution of the interaction would become more efficient by providing access to at least one resource, further comprises a browsing history of the user.

14. The method of claim 10, wherein the transmitting the additional instructions to initiate display, over the floating interactive box, the at least one resource is based on:
the machine learning algorithm determining that presenting quick reference or hot words to the user would improve the efficiency of the interaction.

15. The method of claim 14, wherein access to the at least one resource is facilitated using the quick reference or hot words and the transmitting of the additional instructions to initiate display of the at least one resource further comprises:
transmitting of the additional instructions to initiate display of the quick reference or hot words using the floating interactive box.

16. The method of claim 15, wherein in response to the quick reference or hot words being displayed, over the floating interactive box, the method further comprises:
receiving user selection from the user device of one of the quick reference or hot words;
in response to receiving the user selection, navigating the user to the at least one resource.

17. The method of claim 10, further comprising:
processing user requirements data from the interaction using a machine learning algorithm to identify new solutions for the user.

18. The method of claim 10, further comprising:
transmitting instructions to initiate presentation of the new solutions to the user.

19. A system for controlling display on a user device of a graphical user interface comprising a floating interactive box using machine learning for quick-reference to objects for a user using a web-based portal or dedicated application on a user device, the system comprising:
at least one processor;
a communication interface communicatively coupled to the at least one processor; and
a memory device storing executable code that, when executed, causes the processor to:
transmit instructions to initiate display on the user device of a graphical user interface comprising a floating interactive box comprising an interaction between the user and at least one entity associate, wherein lack of access to necessary resources inhibits efficient resolution of the interaction, thereby unnecessarily consuming computing resources;

process data from the interaction using a machine learning algorithm to determine quick reference or hot words to present to the user to improve the efficiency of the interaction;

transmit instructions to initiate display on the user device of the quick reference or hot words using the floating interactive box;

receive user selection from the user device of one of the quick reference or hot words;

in response to receiving the user selection, transmit further instructions to initiate display of a pointer for directing to the at least one resource and receive an input, via the pointer, to initiate an authentication procedure to access to the at least one resource;

receive and authenticate user credentials of the user via a basic level of authentication or an elevated level of authentication, the elevated level of authentication differing from the basic level of authentication and corresponding to an elevated level of account access needed to obtain access to the at least one resource, the user credentials facilitating access to the at least one resource;

transmit additional instructions to initiate display, over the floating interactive box and based on the user credentials being authenticated, the at least one resource;

receive confirmation from the user device that the interaction is resolved; and upon resolution of the interaction, transmit another set of instructions to end display of the floating interactive box, wherein presenting access to the at least one resource resulting in resolution of the interaction and ending display of the floating interactive box quickly frees computing resources for other tasks.

20. The system of claim 19, wherein the executable code, when executed, further causes the processor to:

process user requirements data from the interaction using a machine learning algorithm to identify new solutions for the user; and transmit instructions to initiate presentation of the new solutions to the user.

\* \* \* \* \*